(12) United States Patent
Matsumoto

(10) Patent No.: US 6,507,407 B1
(45) Date of Patent: Jan. 14, 2003

(54) WINDOW SYSTEM CHARACTER PROCESSING UTILIZING A DETERMINATION OF FONT DOWNLOADABILITY AND AVAILABILTY

(75) Inventor: Hirotsugu Matsumoto, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 07/959,126

(22) Filed: Oct. 9, 1992

(30) Foreign Application Priority Data

| Oct. 11, 1991 | (JP) | 3-263884 |
| Oct. 11, 1991 | (JP) | 3-263889 |
| Oct. 11, 1991 | (JP) | 3-263890 |

(51) Int. Cl.$^7$ .............................................. G06F 15/00
(52) U.S. Cl. ..................................... 358/1.11; 358/1.16
(58) Field of Search ................................ 395/117, 118, 395/151, 157, 114, 110, 112; 345/115, 119, 141, 143, 467, 471, 947, 948, 468, 340; 358/1.15, 1.11, 1.13, 528, 530, 532, 452, 453, 462, 1.16, 1.17, 1.18; 707/500, 512, 528, 529, 542

(56) References Cited

U.S. PATENT DOCUMENTS

| 4,594,674 | A | * | 6/1986 | Boulia et al. | 395/150 |
| 4,686,525 | A |   | 8/1987 | Nagata | 340/790 |
| 4,975,690 | A | * | 12/1990 | Torres | 340/721 |
| 5,018,078 | A | * | 5/1991 | Urube et al. | 364/518 |
| 5,124,809 | A | * | 6/1992 | Koishikawa | 358/400 |
| 5,142,613 | A | * | 8/1992 | Morikawa et al. | 395/110 |
| 5,142,614 | A | * | 8/1992 | Schneider et al. | 395/115 |
| 5,148,293 | A | * | 9/1992 | Miyachi | 395/110 |
| 5,150,456 | A | * | 9/1992 | Wu et al. | 395/114 |
| 5,167,013 | A | * | 11/1992 | Hube et al. | 395/110 |
| 5,206,736 | A | * | 4/1993 | Simpson | 358/296 |
| 5,251,293 | A | * | 10/1993 | Ishii et al. | 395/151 |
| 5,273,434 | A | * | 12/1993 | Peck | 434/224 |
| 5,313,565 | A | * | 5/1994 | Mori | 395/118 |
| 5,361,332 | A | * | 11/1994 | Yoshida et al. | 395/110 |
| 5,444,829 | A | * | 8/1995 | Kawabata et al. | 707/542 |
| 5,630,031 | A | * | 5/1997 | Kurumida | 358/1.16 |
| 5,671,339 | A | * | 9/1997 | Kumada | 358/1.1 |

FOREIGN PATENT DOCUMENTS

| EP | 352741 | 1/1990 | G09G/1/00 |
| EP | 0356104 A2 | 2/1990 | |
| JP | 63-016323 | 1/1988 | |
| JP | 01-158142 | 1/1989 | |
| JP | 02-150371 | 6/1990 | |
| WO | WO90 12359 | 10/1990 | G06F/3/12 |

OTHER PUBLICATIONS

"Peter Norton's Guide To Windows 3.0 Power Programming Technique", pp. 6.2–6.3, Jan. 1992 (in Chinese, with English translation).

* cited by examiner

*Primary Examiner*—Gabriel Garcia
(74) *Attorney, Agent, or Firm*—Fitzpatrick, Cella, Harper & Scinto

(57) ABSTRACT

An information processing apparatus and method are provided for controlling a printer. The apparatus comprises a first determination device for determining whether character pattern data representing a pattern of a character can be downloaded to the printer, and a download device for downloading the character pattern data to the printer in a case where the first determination device determines that a download is possible. The apparatus also comprises a first transmission device for transmitting a character code to the printer in a case where character pattern data is downloaded to the printer by the download device, an acquisition device for acquiring image information corresponding to the character in a case where character pattern data for a character is not downloaded by the download device, and a second transmission device for transmitting the acquired image information to the printer.

8 Claims, 25 Drawing Sheets

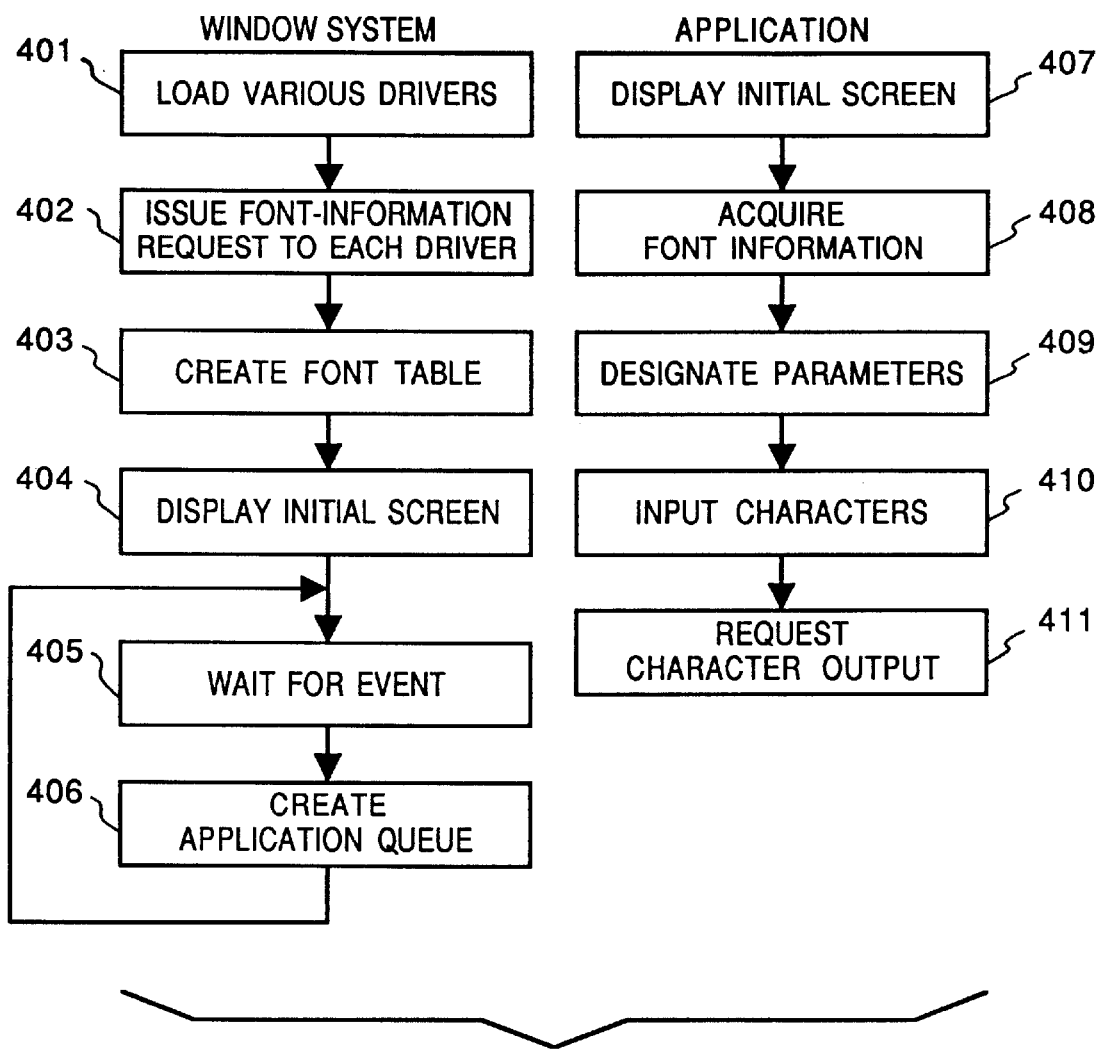
F I G. 4

PRINTER-DRIVER FONT TABLE

| DRIVER CATEGORY | DATA-FORMAT CATEGORY | FONT NAME |
|---|---|---|
| A | A FORMAT | MING STYLE A |
| A | A FORMAT | BLOCK STYLE A |
| B | B FORMAT | GOTHIC STYLE B |
| B | B FORMAT | BRUSH STYLE B |
| | | |
| | | |

FIG. 5

FONT-DRIVER FONT TABLE

| DRIVER CATEGORY | DATA-FORMAT CATEGORY | FONT NAME |
|---|---|---|
| A | A FORMAT | MING STYLE A |
| A | A FORMAT | ROUND GOTHIC STYLE A |
| B | B FORMAT | ROUND GOTHIC STYLE B |
|  |  |  |
|  |  |  |
|  |  |  |

FIG. 6

| MING STYLE A |
|---|
| ROUND GOTHIC STYLE A |
| ROUND GOTHIC STYLE B |
| BLOCK STYLE A |
| GOTHIC STYLE B |
| BRUSH STYLE B |

FIG. 7

DESIGNATION OF BLOCK STYLE

DISPLAY IN ROUND GOTHIC-STYLE (WYSIWYG NOT REALIZED)

COMMAND TRANSFER (CURTAILED TRANSFER TIME)

PRINTOUT IN BLOCK STYLE

DESIGNATION OF MING STYLE

DISPLAY IN
MING STYLE
(WYSIWYG
REALIZED)

COMMAND TRANSFER
(CURTAILED TRANSFER TIME)

PRINTOUT IN
MING STYLE

PRINTER-DRIVER FONT TABLE

| DRIVER CATEGORY | DATA-FORMAT CATEGORY | STORAGE LOCATION | FONT NAME |
|---|---|---|---|
| A | A FORMAT | HD | MING STYLE A |
| A | A FORMAT | HD | BLOCK STYLE A |
| B | B FORMAT | HD | GOTHIC STYLE B |
| B | B FORMAT | HD | BRUSH STYLE B |
| A | A FORMAT | CARTRIDGE | ROUND GOTHIC STYLE A |
| | | | |

FIG. 13

| DRIVER CATEGORY | DATA-FORMAT CATEGORY | FONT NAME |
|---|---|---|
| A | A FORMAT | MING STYLE A |
| A | A FORMAT | BLOCK STYLE A |
| B | B FORMAT | GOTHIC STYLE B |
| B | B FORMAT | BRUSH STYLE B |
| | | |
| | | |

FIG. 19

PRINTER-DRIVER FONT TABLE

| DRIVER CATEGORY | DATA-FORMAT CATEGORY | STORAGE LOCATION | FONT NAME |
|---|---|---|---|
| A | A FORMAT | HD | MING STYLE A |
| A | A FORMAT | HD | BLOCK STYLE A |
| B | B FORMAT | HD | GOTHIC STYLE B |
| B | B FORMAT | HD | BRUSH STYLE B |
| | | | |
| | | | |

FIG. 20A

PRINTER-DRIVER FONT TABLE

| DRIVER CATEGORY | DATA-FORMAT CATEGORY | STORAGE LOCATION | FONT NAME |
|---|---|---|---|
| A | A FORMAT | HD | MING STYLE A |
| A | A FORMAT | HD | BLOCK STYLE A |
| B | B FORMAT | HD | GOTHIC STYLE B |
| B | B FORMAT | HD | BRUSH STYLE B |
| A | A FORMAT | CARTRIDGE | ROUND GOTHIC STYLE A |
| | | | |

F I G. 20B

FONT-DRIVER FONT TABLE

| DRIVER CATEGORY | DATA-FORMAT CATEGORY | FONT NAME |
|---|---|---|
| A | A FORMAT | MING STYLE A |
| A | A FORMAT | ROUND GOTHIC STYLE A |
| B | B FORMAT | ROUND GOTHIC STYLE B |
| B | B FORMAT | X STYLE |
| | | |
| | | |

FIG. 21

WINDOW SYSTEM CHARACTER PROCESSING UTILIZING A DETERMINATION OF FONT DOWNLOADABILITY AND AVAILABILTY

BACKGROUND OF THE INVENTION

This invention relates to a character processing method in a window system.

A window system usually has a display unit and a printer as input/output units. In order to reduce the dependence of the window system upon the hardware (especially the printer), a printer driver which acts as an intermediary between the connected printer and the window system is provided within the system or external thereto.

In the conventional window system, the output devices have their own character data. That is, the character data possessed by the printer is exclusively for the printer, and the character data displayed on the display is exclusively for the display.

Further, information indicating which fonts are usable by the printer is either imbedded in the aforesaid printer driver or registered beforehand in a hard disk or the like.

However, the prior art described above has the following drawbacks:

(1) It is necessary to provide font data on both the display and printer sides irrespective of the fact that the same characters are outputted to the display and printer sides. This places a heavy burden upon the user. Though a method is available in which fonts are developed on the host side and delivered to the printer in a case where the printer does not possess fonts, this method takes possession of the CPU on the host side, as a result of which user waiting time is lengthened and operating efficiency declines.

(2) Even if a ROM cartridge of optional fonts is loaded in the printer, the fonts are not used effectively. Since the fonts are always developed into an image on the host side at the time of output, the CPU on the host side is occupied at such time, user waiting time is lengthened and operating efficiency declines. Even if the user possesses the font data, it cannot be utilized.

SUMMARY OF THE INVENTION

Accordingly, an object of the present invention is to provide a character processing method in a window system which manages a plurality of tasks and a printer driver, wherein when a character pattern is outputted to a printer, the window system is capable of controlling to transfer the character pattern as image or code to the printer and of outputting character patterns of high quality and at high speed in conformity with the prevailing conditions.

Another object of the present invention is to provide a character processing method in a window system which manages at least a printer driver, wherein when a character pattern is outputted to a printer to which fonts are capable of being downloaded, the window system is capable of verifying whether fonts have been downloaded to the printer and of outputting character patterns of high quality and at high speed in conformity with the prevailing conditions.

Yet another object of the present invention is to provide a character processing method in a window system which manages at least a printer driver, wherein when a character pattern is outputted to a printer in which a cartridge is capable of being installed, the window system is capable of verifying whether the cartridge has been installed in the printer and of outputting character patterns of high quality and at high speed in conformity with the prevailing conditions.

BRIEF DESCRIPTION OF THE DRAWINGS

FIG. 4 is a flowchart showing the flow of a procedure in a window system and in an application program;

FIG. 5 is a diagram showing a font table of a printer driver;

FIG. 6 is a diagram showing a font table of a font driver;

FIG. 7 is a diagram showing the names of fonts sent back to an application program;

FIG. 13 is a diagram showing a font table of a printer driver used in the second embodiment;

FIG. 19 is a diagram showing the initial state of a font table in a printer driver according to the fourth embodiment;

FIGS. 20A and 20B are diagrams showing a change in the font table of the printer driver according to the fourth embodiment;

FIG. 21 is a diagram showing a font table in a font driver used in the fourth embodiment.

DESCRIPTION OF THE PREFERRED EMBODIMENTS

First through fourth embodiments of the present invention will now be described with reference to the accompanying drawings.

<System Configuration>

Figure 1:
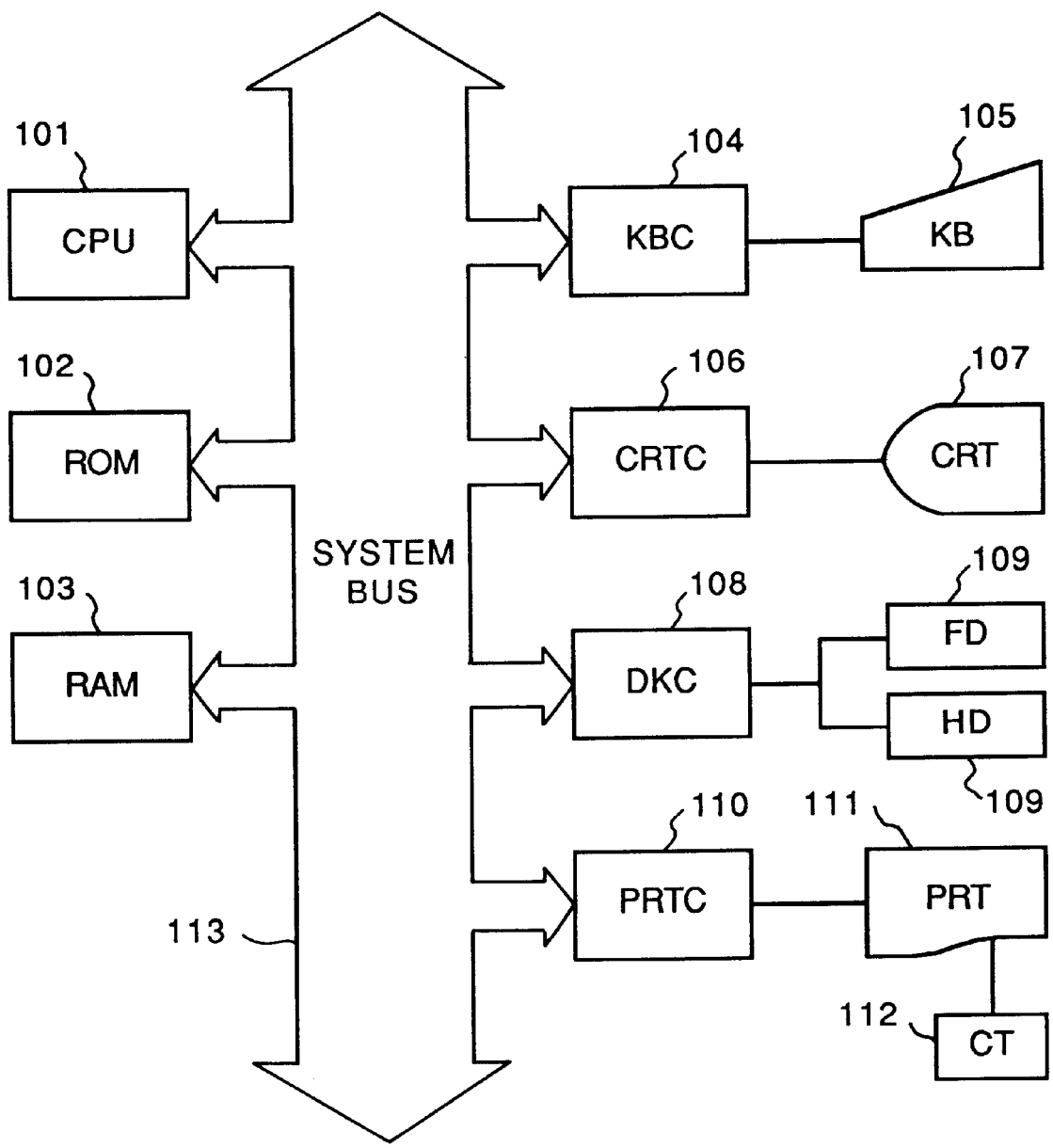
FIG. 1 is a block diagram showing the basic construction of a character processing system according to the embodiments of the present invention.

FIG. 1 is a block diagram showing the basic construction of a Japanese-language character processing system to which the present invention is applied. The configuration of the blocks is the same for the first through fourth embodiments. If the system is a character processing system, it may be an English word processor or a work station or a computer system having a character processing function.

The system shown in FIG. 1 includes a CPU (central processing unit) 10 for controlling the overall system and executing various processing, and a ROM (read-only memory) 102, which is a storage area for a system start-up program, character pattern data and the like, wherein the character pattern data usually is used as the system fonts and it utilized is displaying the characters of a menu or the like. The fonts used as the system fonts are stored in the ROM 102 and may be font data which cannot be designated or changed (such as Ming-style fonts having a 16-dot bit-map format) or fonts that the user has designated in advance. The system further includes a RAM (random-access memory) 103 having a storage area for data of unlimited use. Programs represented by flowcharts, described below, corresponding to a variety of processing, as well as data, are loaded in the storage area of RAM 103. DKC 108 is a disk controller which controls floppy and hard disks 109.

Figure 2:
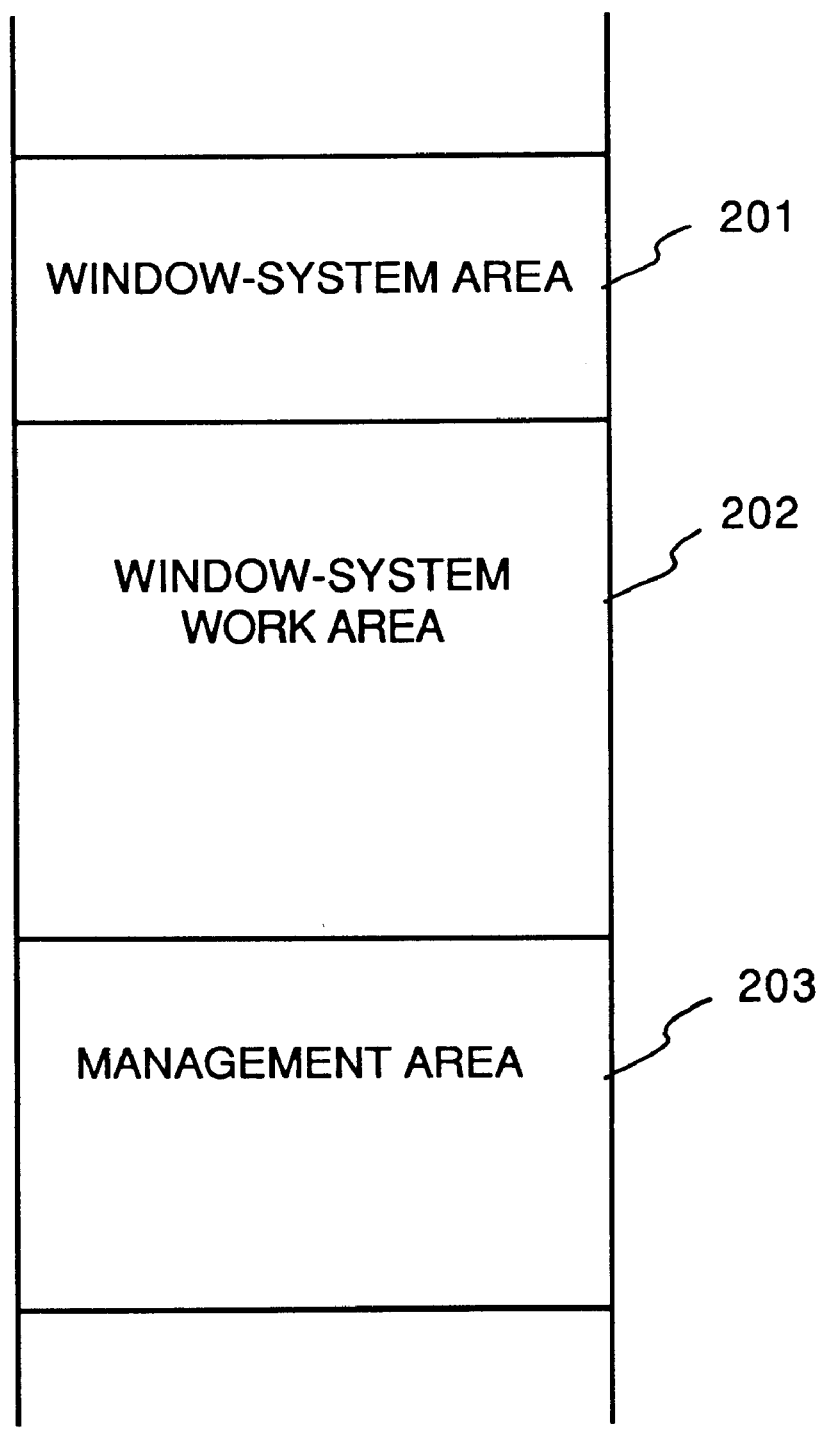
FIG. 2 is a memory map of a RAM used in the system of FIG. 1.

FIG. 2 illustrates the details of the memory map of RAM 103. In FIG. 2, numeral 201 denotes a system area in which a window system 301 is loaded, 202 a work area, and 203 a system management area. Management information such as a printer-driver font table shown in FIG. 5 and a font-driver font table shown in FIG. 6 is stored in the management area 203. The printer-driver font table stores information regarding fonts usable in a printer driver, described below, and the font-driver font table stores information regarding fonts usable in a font driver.

With reference again to FIG. 1, numeral 104 denotes a KBC (keyboard controller) for accepting key input data from a keyboard (KB) 105 and transmitting the data to the CPU 101. Also provided are a CRTC (display controller) 106 for receiving data from the CRTC 106 and displaying the data. Numeral 109 designates external memory devices such as an FD (floppy disk) or HD (hard disk) in which programs and data are stored in advance. When processing is executed, the programs and data are referred and loaded in the RAM 103 as necessary. There are also provided a PRTC (printer controller) 110 and a PRT (printer) 111. Numeral 112 denotes an optical ROM cartridge, in which font data is stored internally. The internal font data is delivered to the printer 111. The system of FIG. 1 is further provided with a sensor (not shown) which detects the absence or presence of the cartridge 112. Whether or not the cartridge 112 is present may be determined by accessing an address of the cartridge ROM 112 by means of software. Numeral 113 designates a system bus forming a data path connecting the foregoing components.

<Basic Operation of Window System>

Figure 3:
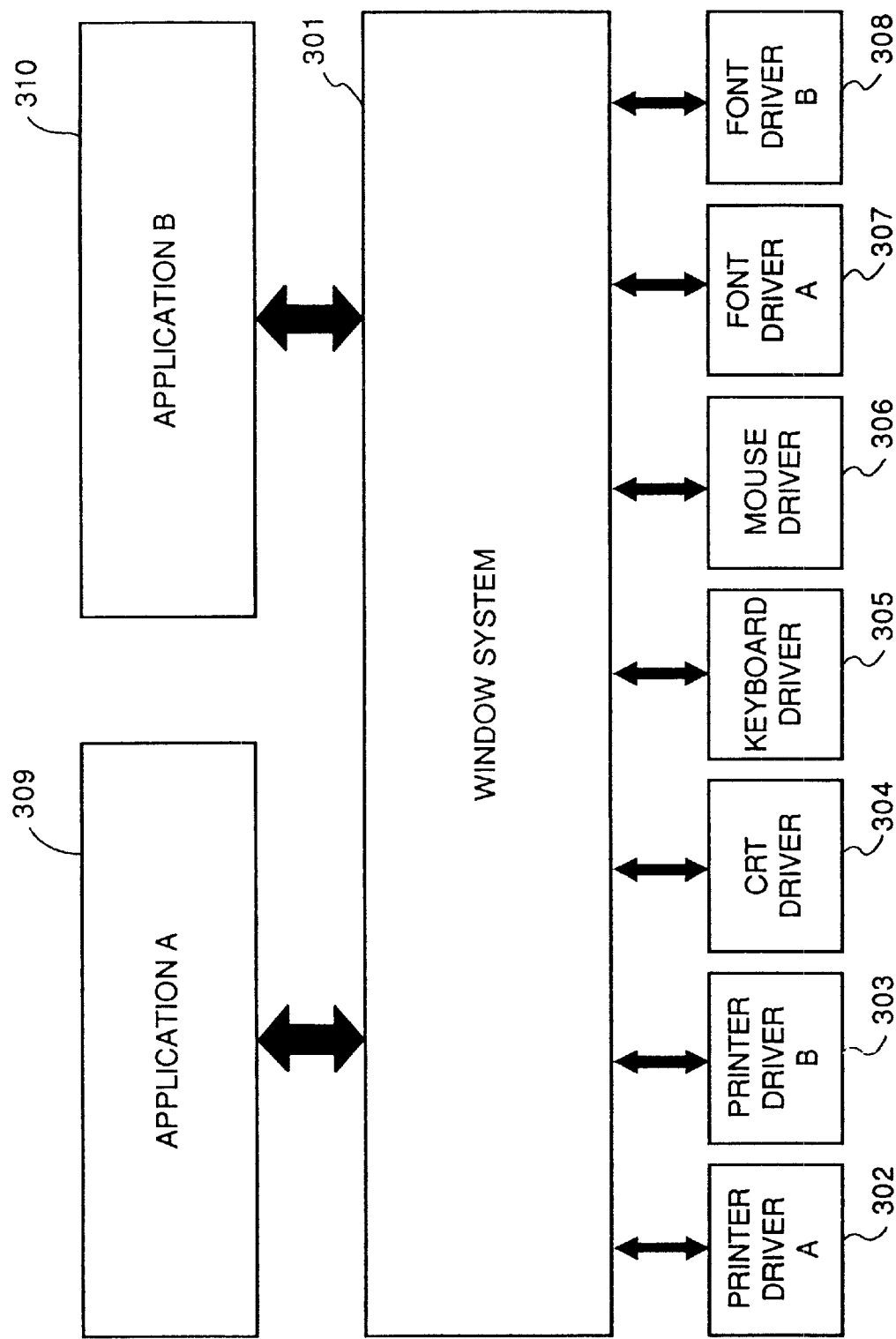
FIG. 3 is a diagram showing the overall flow of processing in the character processing system of the embodiments.

FIG. 3 illustrates the configuration of the window system, and FIG. 4 illustrates the flow of procedure up to when there is a character-output request from an application program.

In FIG. 3, numeral 301 denotes a window system (which may include an OS). The system is loaded in the RAM 103 of FIG. 1 and is started up by the CPU 101. Application programs A and B are user programs. The window system 301 of FIG. 3 is provided with seven items of driver software that are capable of being interfaced. The items of driver software mentioned here are programs for accommodating the hardware peculiarities of the hardware (e.g., printers and CRT) connected to these items of software so that these items of hardware may be connected to the window system 301. The function of the software is to reduce the dependence of the window system 301 upon the hardware. The drivers which are most closely associated with the present invention are printer drivers (302, 303) and font drivers (307, 308). The printer 111 is a page printer which accepts prescribed commands, forms print images and prints out the images page by page in accordance with the commands. The printer drivers serve to interface the system 301 with the printer 111 and are capable of interfacing the printer independently. In particular, the printer drivers in the embodiments described below send character codes in the form of a draw command. The printer 111 interprets this command forms an image corresponding to the particular character and prints the image. The font drivers mainly generate the fonts of characters outputted to a display screen. In terms of usage, they generate an image corresponding to a character in a case where the corresponding font is not present on the printer side.

In FIGS. 3 and 4, the window system (which may include an OS) is loaded in the RAM 103 of FIG. 1 and is started up by the CPU 101.

When the window system 301 is started up, the various drivers (302, 303, 304, 305, 306, 307, 308 in FIG. 3) are loaded in the RAM 103 at step 401 (FIG. 4). Then, at step 402, the printer drivers (302, 303) and font drivers (307, 308) are sent requests for information regarding the kinds of fonts capable of being used in these drivers. This is followed by step 403, at which the window system 301 generates font tables, of the kind shown in FIGS. 5 and 6, in the RAM 103 based upon this information. According to the examples of FIGS. 5 and 6, the present system currently is such that Ming-style and block-style fonts are capable of being used in printer driver A, Gothic-style and brush-style fonts in the printer driver B, Ming-style and round Gothic-style fonts in font driver A and only the round Gothic-style in font driver B.

Next, at step 404, a request to display an initial screen in a window is sent to the display driver 304. The window system 301 then attains a state at step 405 in which it waits for various events from the input device 105, such as the keyboard or mouse. When informed at step 405 of the occurrence of a start-up event regarding the application program, the window system loads and starts up the application program (309, 310, etc.), which is the cause of the event, at step 406 and then waits for an event again.

The application program that has been started up issues an initial-screen display request to the window system at step 407 and then makes an inquiry at step 408 regarding information (font information) concerning the fonts that can be used by the system. The user is notified of the acquired font information, namely the information regarding which fonts are usable, at step 409. In the character input routine of step 410, a character code used by the user is designated by the user. Then, at step 411, the character code inputted at step 410, as well as the designated font name, size and output device, etc., is delivered to the window system along with a character-output request.

The window system 301 executes the processing of step 405 with this character-output request serving as an event, and then places it in an application-program queue at step 406. When this is done, the inputted character is displayed and outputted.

FIG. 7 is a list of the names of font which, as a result of step 408, the application program allows the user to use.

This list may be displayed on the CRT 107. The user utilizes a font upon selecting it from this font list.

Reference will now be made to FIGS. 8A through 10B to describe the kinds of problems that arise when a font designated by the user does not agree with a font usable on the side of the host system or on the side of the printer 111.

<Character Output Example 1>

Figures 8A, 8B:
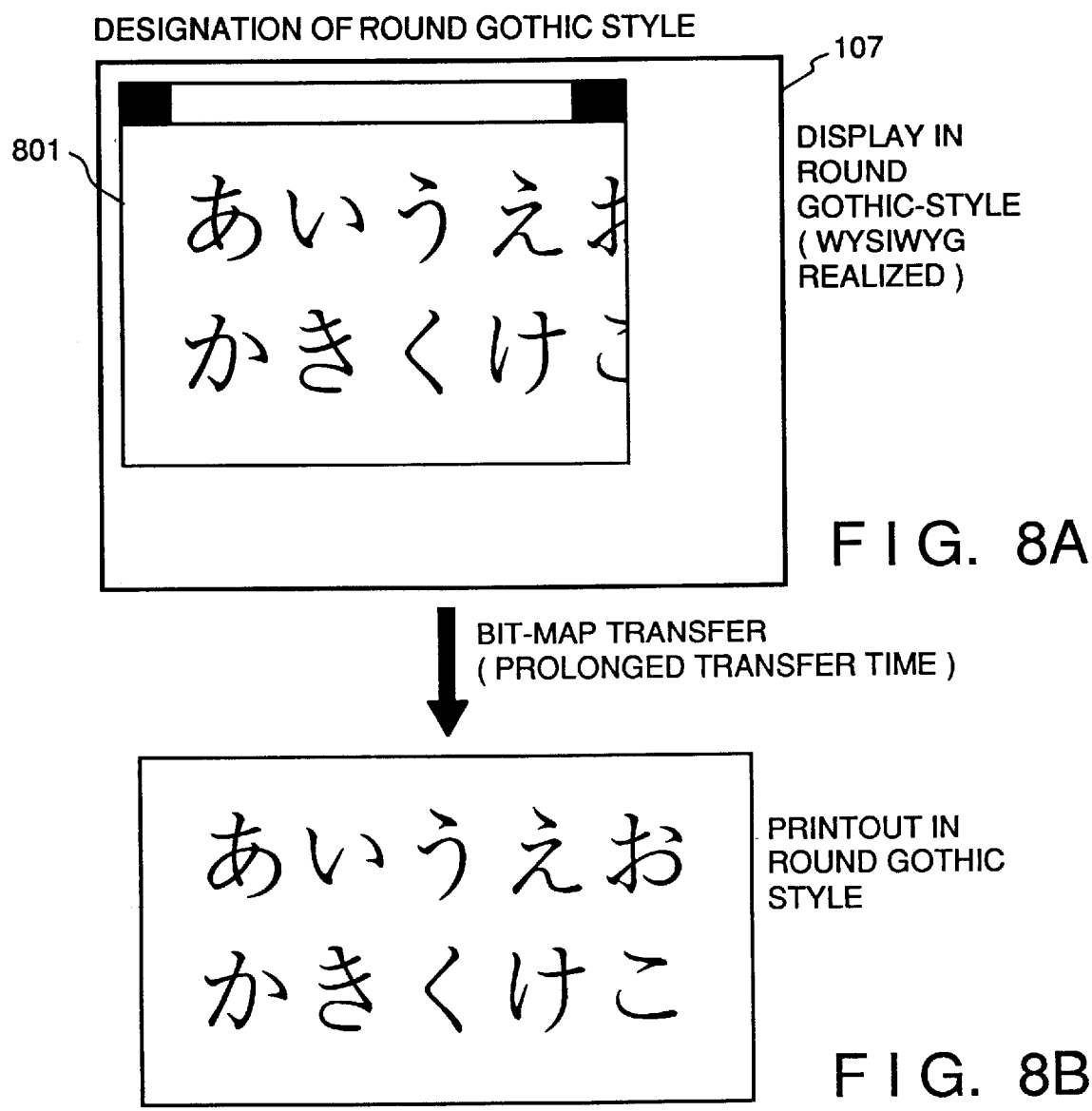
FIGS. 8A, 8B, 9A, 9B, 10A and 10B are diagrams showing examples in which characters inputted by an application program are displayed on a CRT and outputted to a printer.

FIG. 8A illustrates the appearance of a display presented on the CRT 107 when the user inputs a character string upon selecting the round Gothic font A. As shown in FIG. 8A, several Japanese-language hiragana characters are displayed within a window 801. FIG. 8B illustrates the result of outputting the characters, which have been inputted in the window 801 of FIG. 8A, to the printer 111.

It is assumed here that the user has designated the round Gothic font A. Though the round Gothic font has been registered as a usable font in the font table of the font driver (FIG. 6), it has not been registered in the printer driver (FIG. 5). In other words, this means that the round Gothic font A is usable in the system but is not usable in the printer 111. Consequently, the characters are displayed in the round Gothic font in window 801, but the output to the printer 111 is performed by transferring the data bit-map developed in the font driver A (307) to the printer 111 via the printer driver A (302) and outputting this data. As a result, though WYSIWYG ("what you see is what you get") is capable of being realized on the side of the host system, the processing for bit-map development and the transfer of the bit-map data to the printer are carried out under the control of the host (CPU 101). This means that a very long period of time is required before the host becomes free again.

<Output Example 2>

Figure 9A:
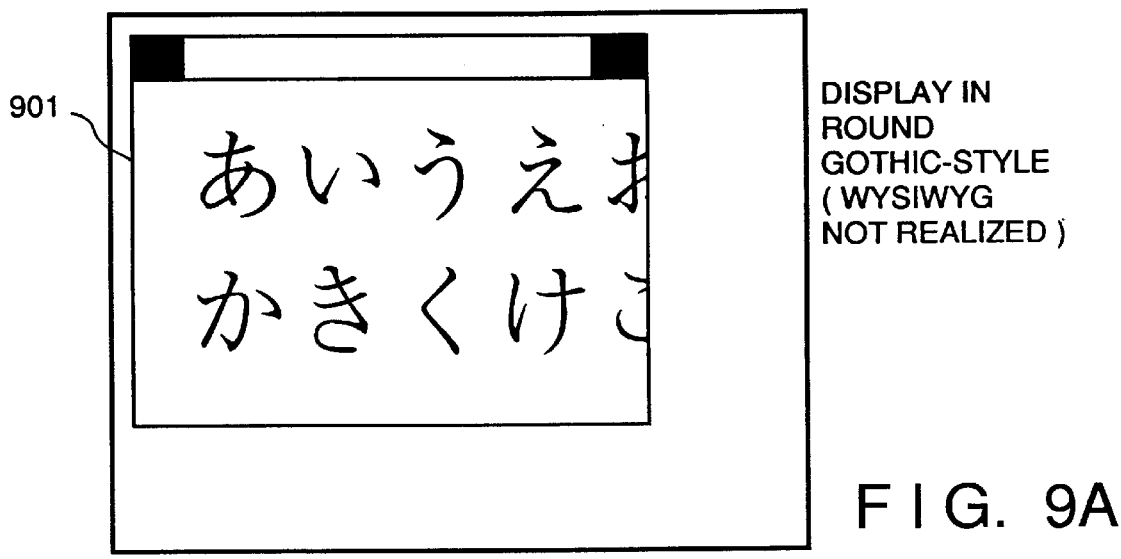
Figure 9B:
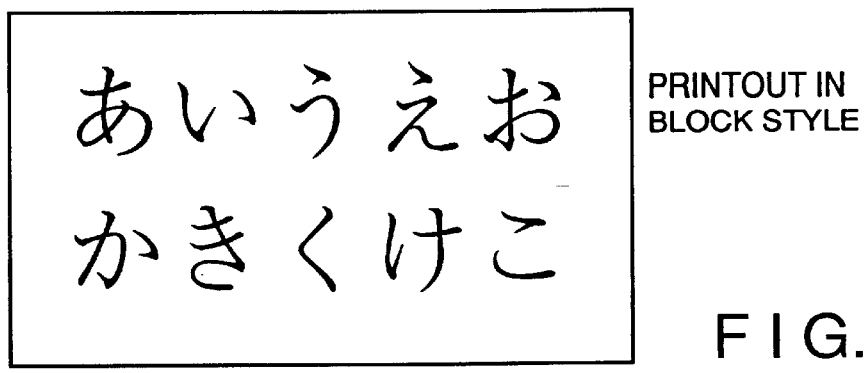

FIG. 9A illustrates the manner in which a window 901 is displayed on the CRT 107 when the user inputs a character string upon selecting the block-style font A. FIG. 9B illustrates the result of outputting the inputted characters to the printer 111.

Though the block-style font A has been registered in the font table of the printer driver (FIG. 5), it has not been registered in the font driver (FIG. 6). In other words, this means that the block-style font A does not exist on the host side. Accordingly, the system font is 10 utilized for the output to the CRT 107. In the example of FIG. 9A, the round Gothic-style font A has been set as the system font, and therefore the inputted characters are displayed in the form of the round Gothic font. On the other hand, the output to the printer is transferred to the printer 11, via the printer driver A (302), as a group of commands capable of being analyzed by the printer 11, and printing is performed by means of the block-style font. Though the host is released sooner because the data transfer takes a short time owing to the command transfer, WYSIWYG cannot be realized on the side of the host system.

<Character Output Example 3>

Figure 10A:
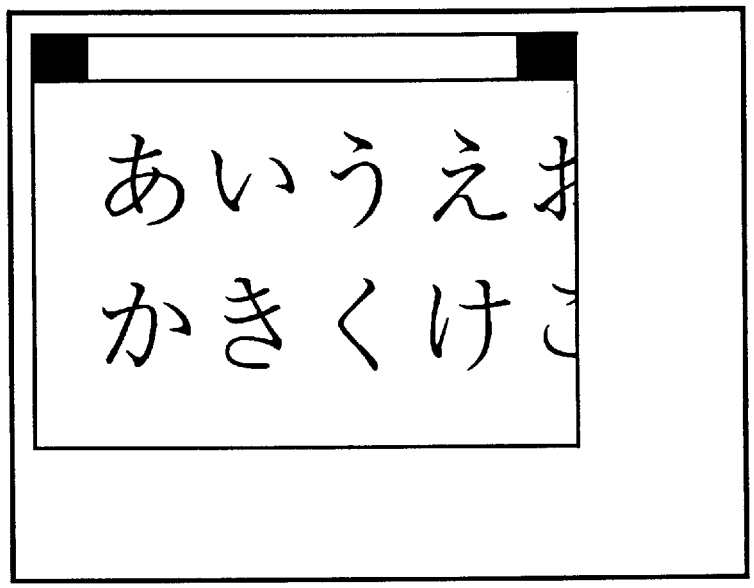
Figure 10B:

FIG. 10A illustrates the appearance of the display when the user inputs a character string upon selecting the Ming-style font A. FIG. 9B illustrates the result of outputting the characters to the printer 111 after input.

The Ming-style font A has been registered in both the font driver (FIG. 6) and the printer driver (FIG. 5). As a result, the font driver A (307) is used for the output to the CRT 107, whereas the output to the printer 111 is transferred to the printer 111 via the printer driver A (302) in the form of a printer control command so that the print-out is made in the form of the Ming-style font. Only a short time is needed for the data transfer owing to the command transfer, and operating efficiency is raised since the host is released in a shorter period of time.

<First Embodiment>

Figure 10B:
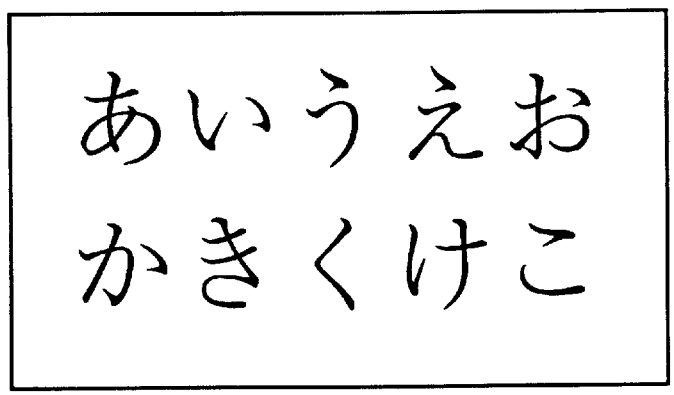
Figure 11:
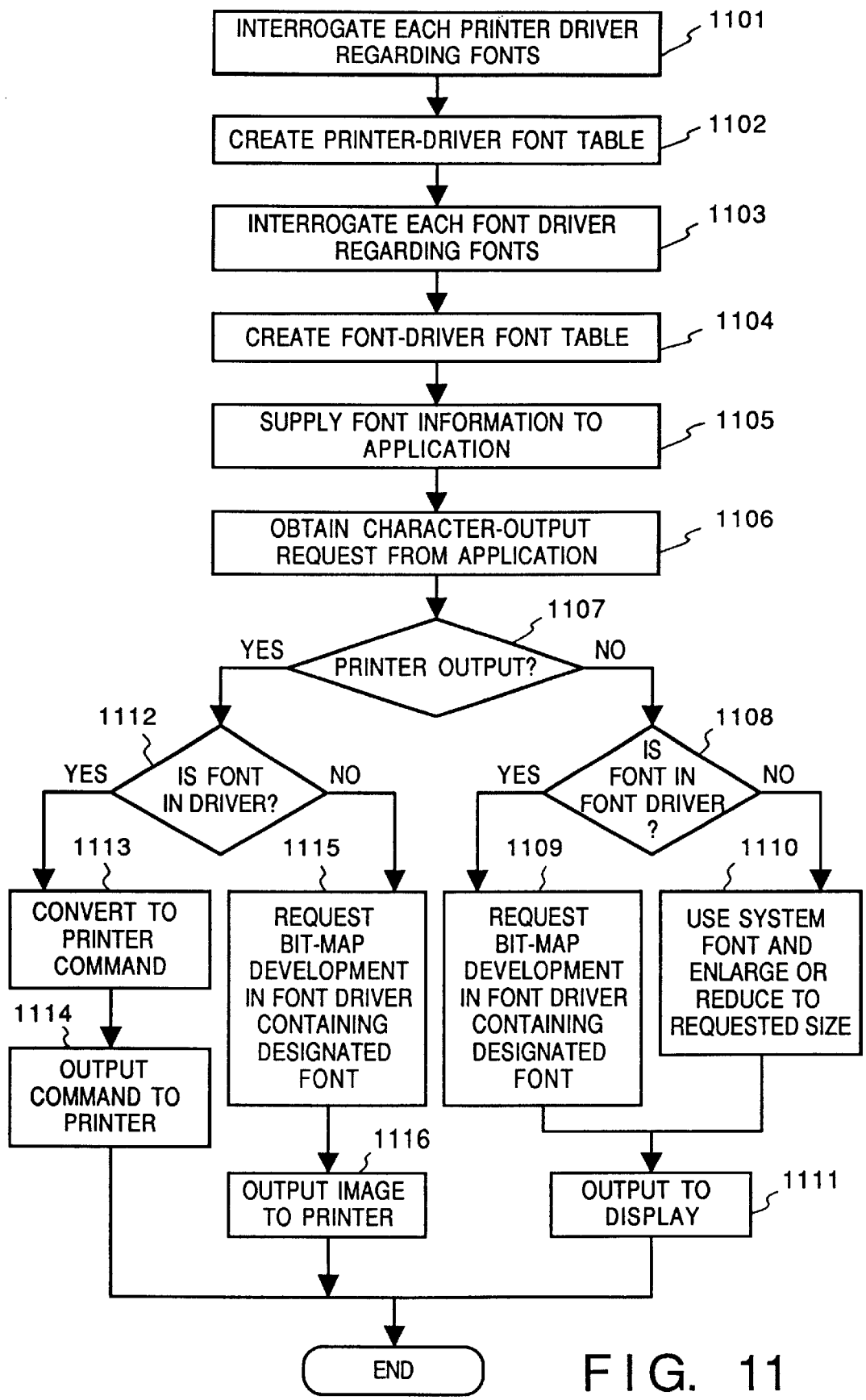
FIG. 11 is a flowchart showing a control procedure of the window system according to a first embodiment.

The basic operation of the window system has been described with reference to FIGS. 3 and 4, and operation in terms of the displayed screens as seen by the user has been illustrated with reference to FIGS. 8 through 10. Next, the operation of the first embodiment will be described in detail using the flowchart of FIG. 11.

When the window system 301 is started up, the system 301 inquires at step 1101 as to the fonts that have been registered in the printer drivers (302, 303). In this embodiment, the font information (font name, data format, etc.) of the kind shown in FIG. 5 is imbedded in the printer drivers (302, 303) themselves, and therefore the printer drivers send this information to the system 301 in response to the inquiry. It should be noted that the font table may be stored in the hard disk 109. Next, at step 1102, and based upon the acquired font information, the window system 301 creates a printer-driver font table, of the kind shown in FIG. 5, in the RAM 103. This is followed by step 1103, at which each font driver (307, 308) is requested for information regarding the font usable thereby. After this information is acquired, the table illustrated in FIG. 6 is created at step 1104. As in the case of the printer driver, the font information of the font driver is imbedded in the font driver itself. However, this may be stored in the hard disk 109.

In order to realize WYSIWYG, it is necessary that the names of the fonts registered in a font driver use the same names as those of the fonts registered in a printer driver.

In response to the font-information request (at step 408 in FIG. 4) from the side of the application program, the font information created at steps 1102, 1104 is sent to the application program at step 1105. A character-output request from the application program is then received at step 1106. This request is made at step 411 in FIG. 4. At step 411, a flag indicating whether an output to the printer (which output includes output-printer designating information) or an output to the display 107 is to be performed, as well as information such as font name, size and embellishment, etc., is delivered as a parameter from the application program to the system 301.

Next, at step 1107, the system 301 determines whether the designated destination for the output is the printer. If the answer is YES, then the program proceeds to step 1113; otherwise (i.e., when the destination is the CRT), the program proceeds to step 1108.

When output destination is the CRT

At step 1108, it is determined whether the font table (FIG. 6) of the font driver (307 or 308) contains the font name requested by the application program and acquired at step 1106. If the table does contain the font name, then the program proceeds to step 1109, at which it is requested that the font driver (307 or 308) containing the font develop, into a bit map, the characters whose output is requested by the application program. The developed result is displayed on the display 107 via the display driver 304 at step 1111. FIGS. 8A and 10A correspond to this display.

If it is found at step 1108 that the font driver does not contain the font name, then the program proceeds to step 1110. This means that the font designated by the user cannot be used in the system and that the system font must be used instead. Therefore, at step 1110, the system font is enlarged or reduced to the size requested by the application program, and the result is displayed on the display device via the CRT driver 304 at step 1111. The size requested by the application program is obtained from the application program at step 1106. This display corresponds to FIG. 9A.

When output destination is the printer

The procedure from step 1112 onward is processing executed when the output is to the printer. It is determined at step 1112 whether the printer driver (302 or 303) contains the font name designated from the application program at step 1106. If the answer is YES, the program proceeds to step 1113; otherwise, the program proceeds to step 1115.

If the printer driver is capable of handling the designated font, a command conversion corresponding to the printer 111 is performed at step 1113 and the code (command) is transferred to the printer 111 at step 1114. The printer 111 performs print-out and processing is terminated. In the preceding example, FIGS. 9B and 10B correspond to this print-out.

The command conversion referred to at step 1113 involves converting a system-specific code (command) outputted by the window system 301 into a code (this may be a code described in a language such as PDL, or data) capable of being handled by the designated printer.

In a case where the font designated by the application program does not exist in the printer driver, i.e., if the printer 111 is incapable of processing the designated font, the program proceeds from step 1112 to step 1115. At step 1115, the font driver capable of handling the designated font is requested to develop the font into a bit-map format. Then, at step 1116, the image in the bit-map format is transferred to the printer 111 via this printer driver. Here the image is printed out and processing is terminated.

<Second Embodiment>

Figure 12A:
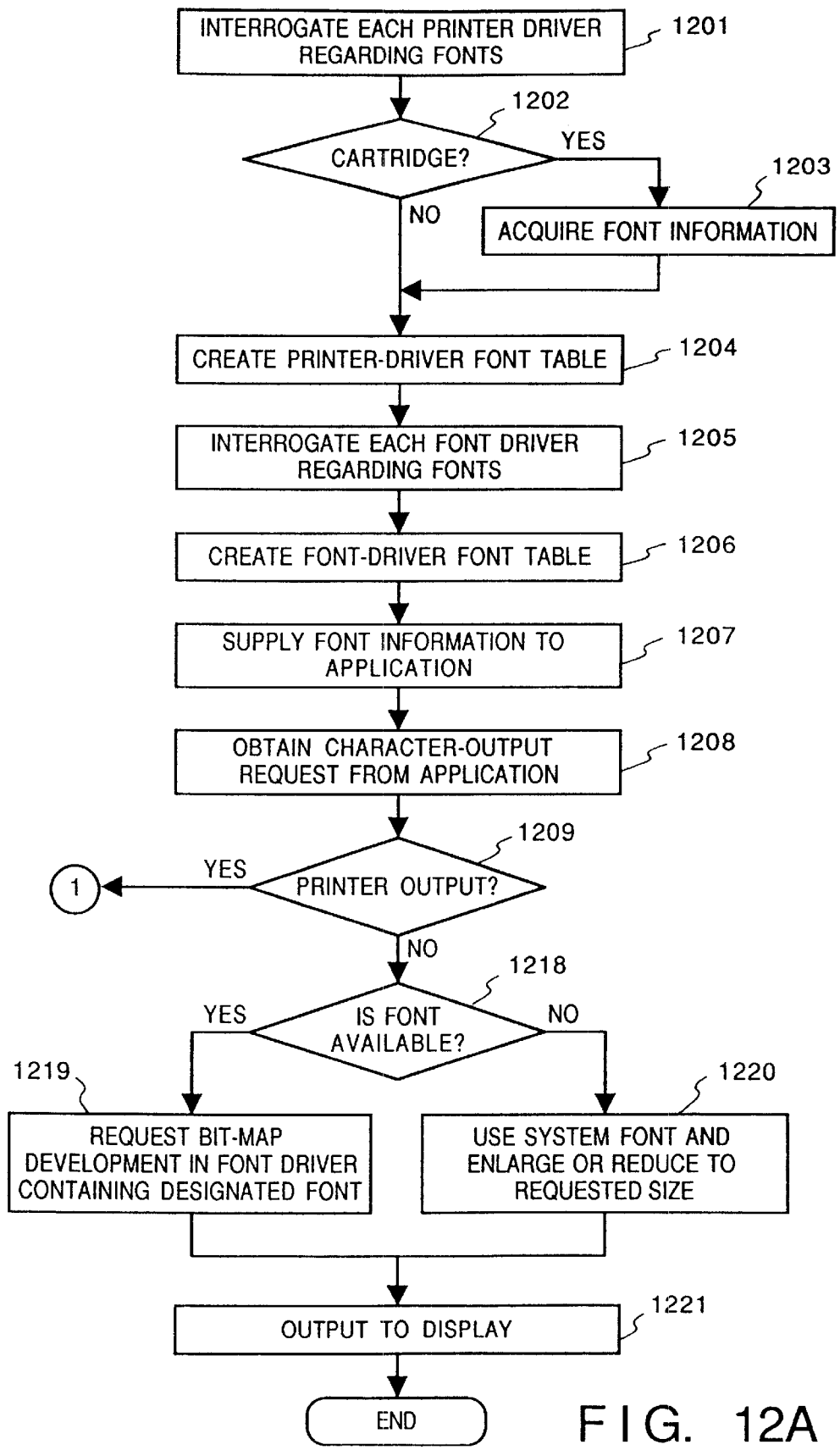
FIGS. 12A and 12B are flowcharts, showing a control procedure of the window system for a case where a judgment concerning a cartridge is added to control in a second embodiment.
Figure 12B:
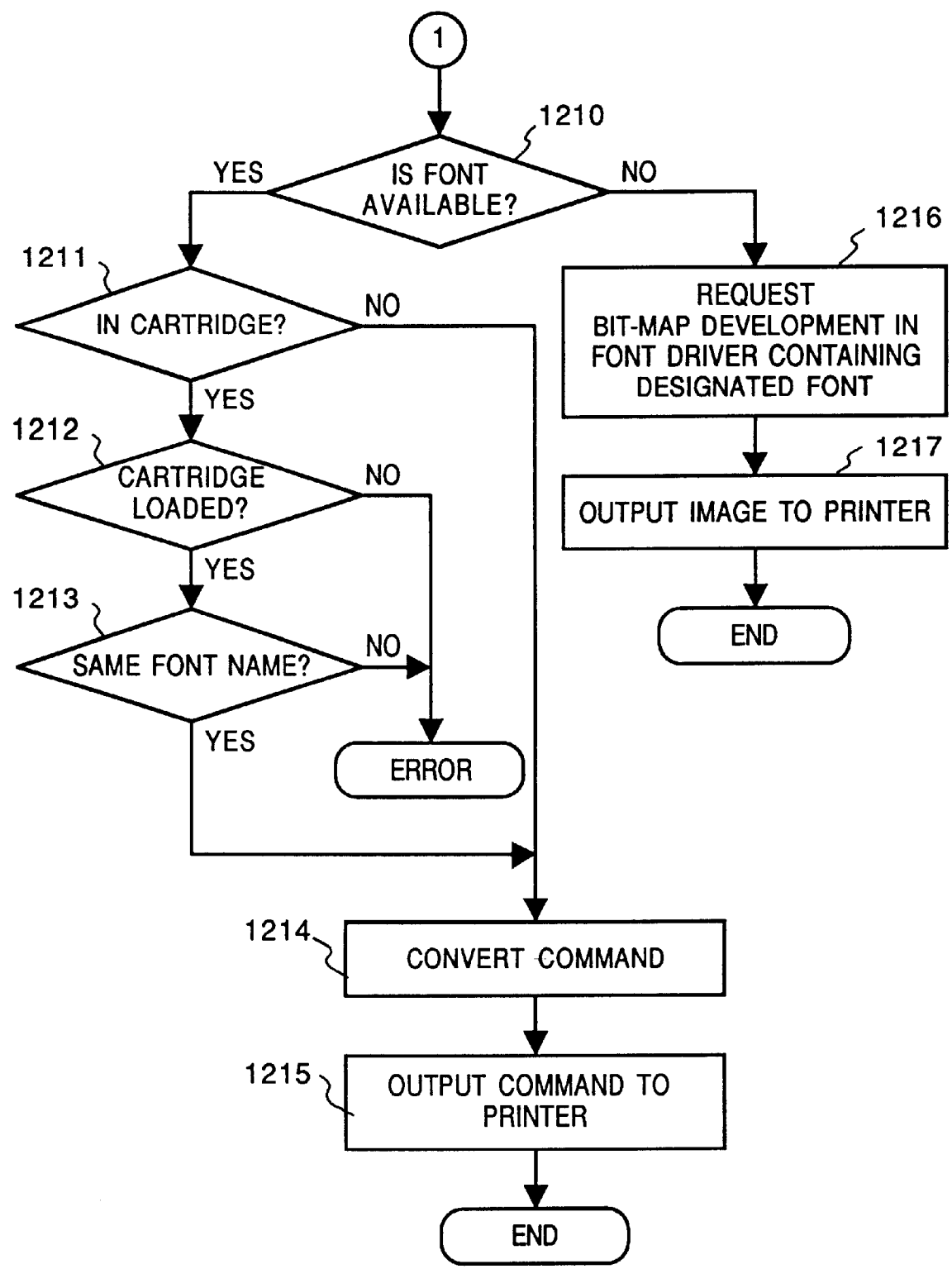

In the first embodiment set forth above, a detailed description has been given of a character processing method having a function for creating font tables up on interrogating printer and font drivers concerning their fonts, and a function for determining, based upon the tables, whether a font identical with a font designated by the application program (the user) is capable of being processed by the printer and display. The second embodiment relates to a processing method for the case where the optional font cartridge 112 is set in the printer 111. This embodiment will be described in detail with reference to the flowchart of FIGS. 12A and 12B. By setting the optional font cartridge 112 in the printer 111 in this embodiment, the number of fonts capable of being handled in the printer 111 is increased.

In the second embodiment, the printer-driver font table (see FIG. 13) is altered by loading the cartridge 112, but the font-driver font table used is the same as that of the first embodiment.

When the window system 301 is started up, the system 301 interrogates the printer drivers (302, 303) at step 1201 concerning the fonts that have been registered in these drivers. Each printer driver responds by sending the font information (font name, data format, etc.) to the system 301. The font information may be stored in the hard disk 109 or imbedded in the printer drivers themselves. Next, at step 1202, it is determined whether the ROM cartridge 112 has been loaded in the printer 111. If the cartridge has been loaded, then the information regarding the fonts stored in the cartridge 112 is acquired at step 1203, after which the program proceeds to step 1204. Thus, the system 301 comes to possess the font information obtained at steps 1201 and 1203. Next, at step 1204, and based upon the acquired font information, the window system 301 creates a printer-driver font table, of the kind shown in FIG. 13, in the RAM 103. The table includes information indicative of storage location. This is followed by step 1205, at which each font driver (307, 308) is requested for font information (font name, data format, etc.). After this information is acquired, the table illustrated in FIG. 6 is created at step 1206.

In the second embodiment also, the font information of the font driver may be stored in the hard disk 109 or imbedded in the font driver itself, just as in the case of the printer driver. In order to realize WYSIWYG, it is necessary that the names of the fonts registered in the font driver be the same as those of the fonts registered in a printer driver.

In response to the font-information request (at step 408 in FIG. 4), the font information in the tables shown in FIGS. 13 and 6 is delivered to the application program at step 1207. A character-output request from the application program is then received at step 1208 (step 411 in FIG. 4). At this time, a flag indicating whether an output to the printer or an output to the display is to be performed, as well as information such as font name, size, embellishment and output-printer designating information, etc., is delivered as a parameter from the application program.

Next, at step 1209, the system 301 determines whether the designated destination for the output is the printer. If the answer is YES, then the program proceeds to step 1210; otherwise, the program proceeds to step 1218.

When output destination is the display

At step 1218, it is determined whether the font table (FIG. 16) of the font driver (307 or 308) contains the font name acquired at step 1208. If the table does contain the font name, then the program proceeds to step 1219, at which it is requested that the font driver (307 or 308) containing the font develop, into a bit map, the characters expressed by the font requested by the application program. The developed result is displayed on the display via the display driver 304 at step 1221.

If it is found at step 1218 that the font driver does not contain the font name, then the program proceeds to step 1426. Here the system font is enlarged or reduced to the requested size. The result is displayed on the display device via the display driver 304 at step 1221.

When output destination is the printer

Step 1210 is processing executed when the output is to the printer. It is determined at step 1210 whether the printer driver (302 or 303) contains the font name requested at step 1208. If the answer is YES, the program proceeds to step 1211; otherwise, the program proceeds to step 1216. At step 1211, a determination as to whether the font designated by the application program is one that is contained in the ROM cartridge 112 is made using the information regarding storage location illustrated in FIG. 13. If it is contained in the ROM cartridge, the program proceeds to step 1212; otherwise, the program proceeds to step 1214. It is determined at step 1212 whether the ROM cartridge 112 has been loaded. If the cartridge has been loaded, the program proceeds to step 1213; otherwise, an error message is displayed and processing is terminated.

It is determined at step 1213 whether the name of the font in the loaded ROM cartridge is identical with the designated font name. If it is identical, then the program proceeds to step 1214; otherwise, an error message is displayed and processing is terminated. Next, at step 1214, a code conversion corresponding to the printer is carried out by the printer driver designated at step 1210, the code is transferred to the printer and printed out at step 1215, and processing is terminated. In the previous example, FIGS. 9B and 10B correspond to this print-out.

The code conversion referred to here involves converting a system-specific code outputted by the window system into a code capable of being handled by the designated printer.

Step 1216 is processing for a case where the font is not present in the printer. Here the font driver in which the font is present is requested to develop the font into a bit-map format. Then, at step 1217, the image is transferred to the printer via this printer driver. Here the image is printed out and processing is terminated.

<Third Embodiment>

Figure 14A:
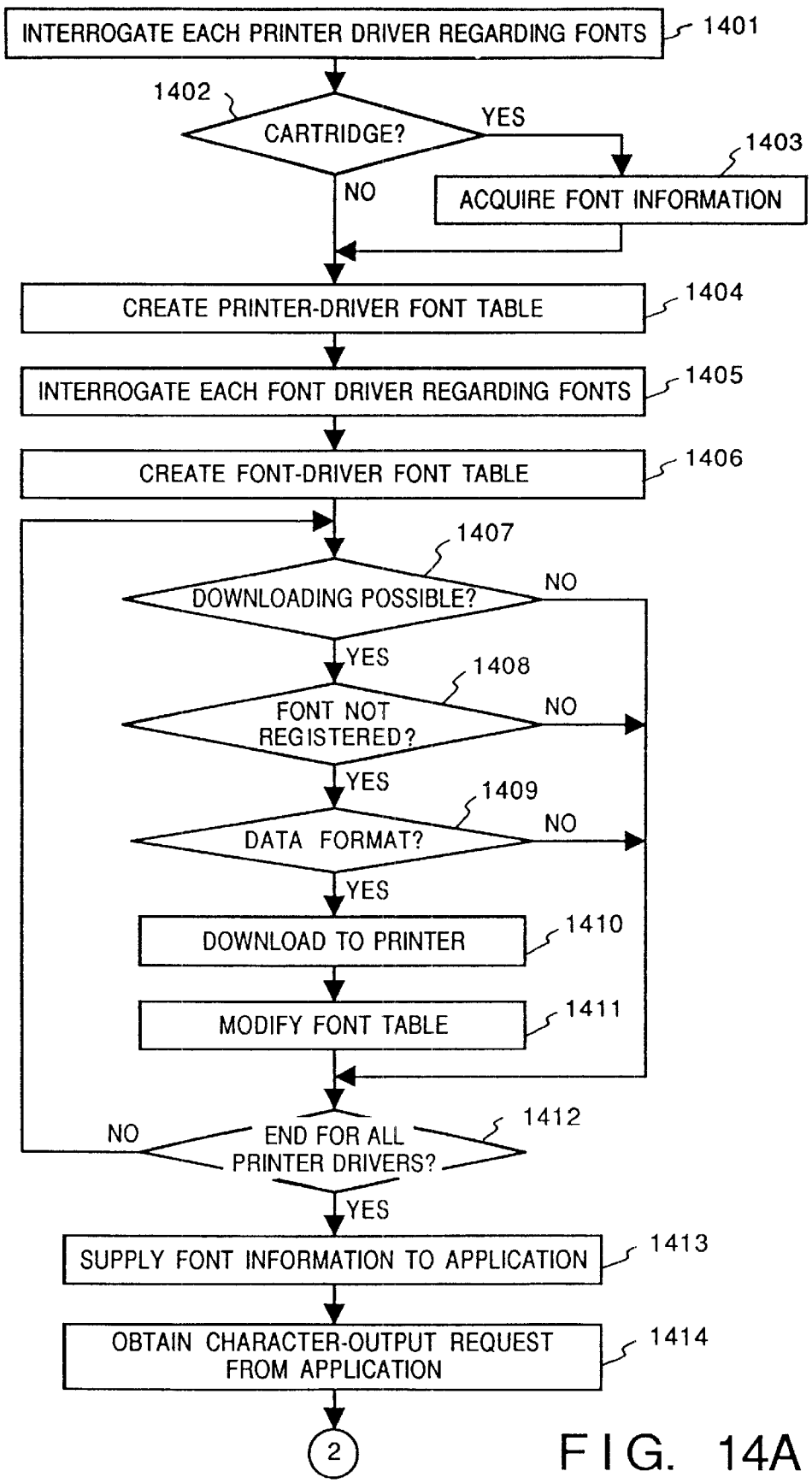
FIGS. 14A and 14B are flowcharts showing a control procedure of the window system in a case where judgment concerning downloading is added to control in a third embodiment.
Figure 14B:
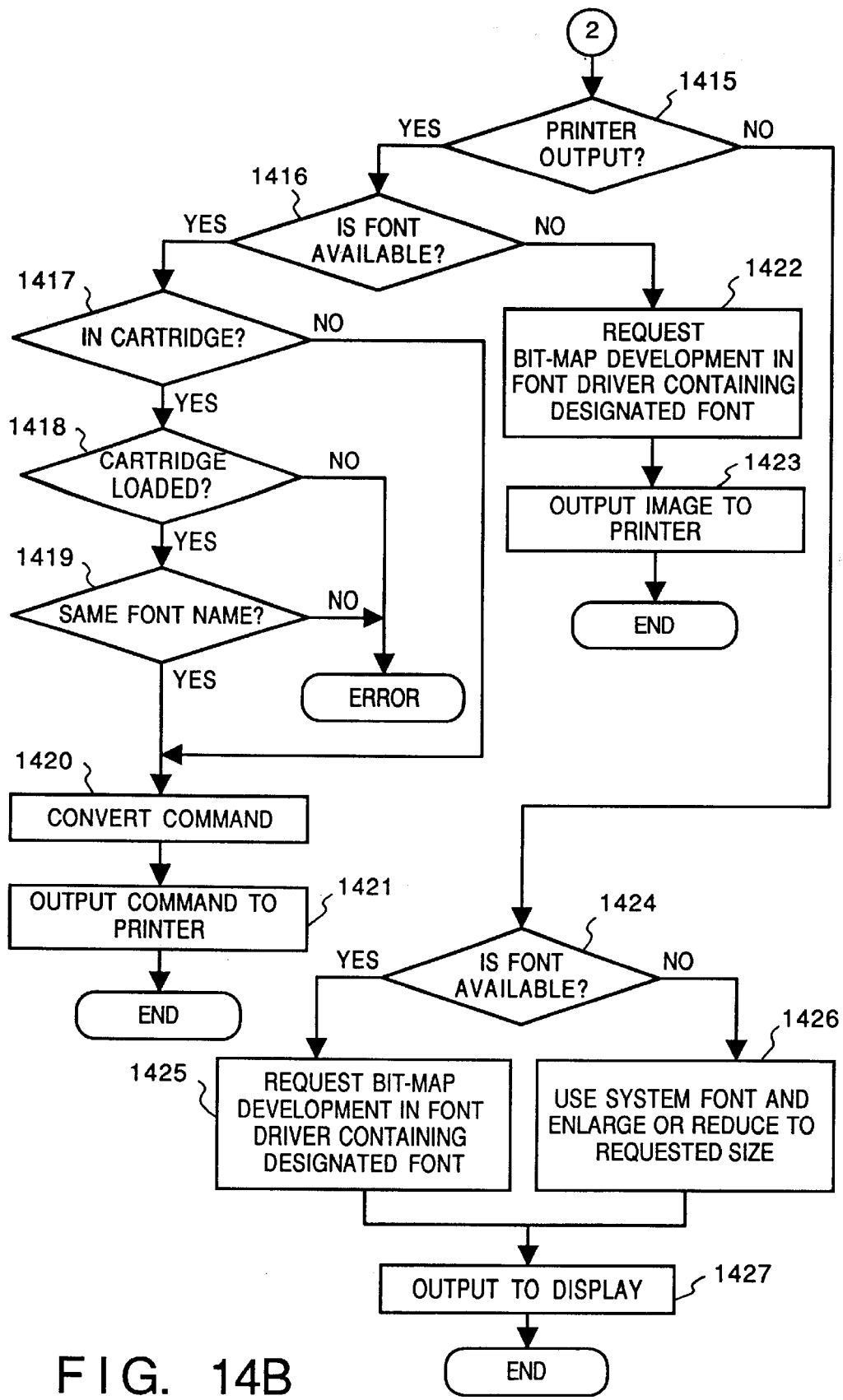

In the first and second embodiments set forth above, a detailed description is given of character processing methods in which inquiries concerning fonts are made, it is determined whether the printer and display have identical fonts, and it is determined whether a font cartridge has been loaded or not. In the third embodiment below, a processing method for a case in which the printer has a downloading function will be described in detail with reference to the flowchart of FIG. 14.

When the window system is started up, the system 301 interrogates the printer drivers (302, 303) at step 1401 concerning the fonts that have been registered in these drivers. Each printer driver responds by sending the font information (font name, data format, etc.) to the system 301. The font information may be stored in the hard disk 109 or imbedded in the printer drivers themselves. Next, at step 1402, it is determined whether the ROM cartridge 112 has been loaded in the printer. If the cartridge has been loaded, then the information regarding the fonts stored in the cartridge 112 is acquired at step 1403, after which the program proceeds to step 1404. Here, based upon the acquired font information, the window system 301 creates a printer-driver font table, of the kind shown in FIG. 13, in the RAM 103. The table includes information indicative of storage location. This is followed by step 1405, at which each font driver (307, 308) is requested for font information. After this information is acquired, the table illustrated in FIG. 6 is created at step 1406.

The font information of the font driver may be stored in the hard disk 109 or imbedded in the font driver itself, just as in the case of the printer driver. In order to realize WYSIWYG, it is necessary that the names of the fonts registered in the font driver use the same names as those of the fonts registered in a printer driver.

Next, at step 1407, it is determined whether downloading to each printer driver is possible. If downloading is possible, the program proceeds to step 1408; otherwise, the program proceeds to step 1412. At step 1408, the two font tables of FIGS. 13 and 6 are compared and fonts registered as usable in the font driver but not registered in the printer drivers (302, 303) are selected. If even one such font exists, the program proceeds to step 1409; otherwise, the program proceeds to step 1412.

At step 1409, the font having the data format presently designated and usable by the printer is selected from among the fonts selected at step 1408. If even one font having a usable data format exists, the program proceeds to step 1410; otherwise, the program proceeds to step 1412. Step 1410 calls for the font selected at step 1409 to be downloaded to the printer 111 via the printer drivers (302, 303).

Next, at step 1411, the downloaded font is added to and registered in the printer-driver font table (FIG. 5). It is then determined at step 1412 whether all printer drivers have been confirmed. If the answer is YES, then the program proceeds to step 1413. If the answer is NO, then processing from step 1407 onward is repeated.

In response to the font-information request (at step 408 in FIG. 4) from the application program, the font information in the tables shown in FIGS. 6 and 13 is delivered to the application program at step 1413. A character-output request from the application program is then received at step 1414. At this time, a flag indicating whether an output to the printer or an output to the display is to be performed, as well as information such as font name, size, embellishment and output-printer designating information, etc., is delivered as a parameter from the application program (step 411 in FIG. 4). Next, at step 1415, the system 301 determines whether the designated destination for the output is the printer. If the answer is YES, then the program proceeds to step 1416; otherwise, the program proceeds to step 1424.

When output destination is the display

At step 1224, it is determined whether the font table (FIG. 16) of the font driver (307 or 308) contains the font name acquired at step 1414. If the table does contain the font name, then the program proceeds to step 1425, at which it is requested that the font driver (307 or 308) containing the font develop, into a bit map, the characters expressed by the font requested by the application program. The developed result is displayed on the display via the display driver 304 at step 1421.

If it is found at step 1424 that the font driver does not contain the font name, then the program proceeds to step 1426. Here the system font is enlarged or reduced to the requested size. The result is displayed on the display device via the display driver 304 at step 1472.

When output destination is the printer

Step 1416 is processing executed when the output is to the printer. It is determined at step 1416 whether the printer driver (302 or 303) contains the font name requested at step 1414. If the answer is YES, the program proceeds to step 1417; otherwise, the program proceeds to step 1422. At step 1417, a determination as to whether the designated font is one stored in the ROM cartridge 112 is made using the storage-location information of the printer-driver font table (FIG. 13). If it has been stored in the ROM cartridge, the program proceeds to step 1418; otherwise, the program proceeds to step 1420.

It is determined at step 1418 whether the requested ROM cartridge 112 has been loaded. It the cartridge has been loaded, the program proceeds to step 1419; otherwise, an error message is displayed and processing is terminated.

It is determined at step 1419 whether the name of the font stored in the loaded ROM cartridge is identical with that requested by the application program. If it is identical, then the program proceeds to step 1420; otherwise, an error message is displayed and processing is terminated. Next, at step 1420, a code conversion corresponding to the printer is carried out by the designated printer driver, the converted code is transferred to the printer and printed out at step 1421, and processing is terminated. In the previous example, FIGS. 9B and 10B correspond to this print-out.

The code conversion referred to here involves converting a system-specific code outputted by the window system into a code capable of being handled by the designated printer.

Step 1422 is processing for a case where the font is not present in the printer. Here the font driver in which the font is present is requested to develop the font into a bit-map format. Then, at step 1423, the image is transferred to the printer via this printer driver. Here the image is printed out and processing is terminated.

<Fourth Embodiment>

Figure 15:
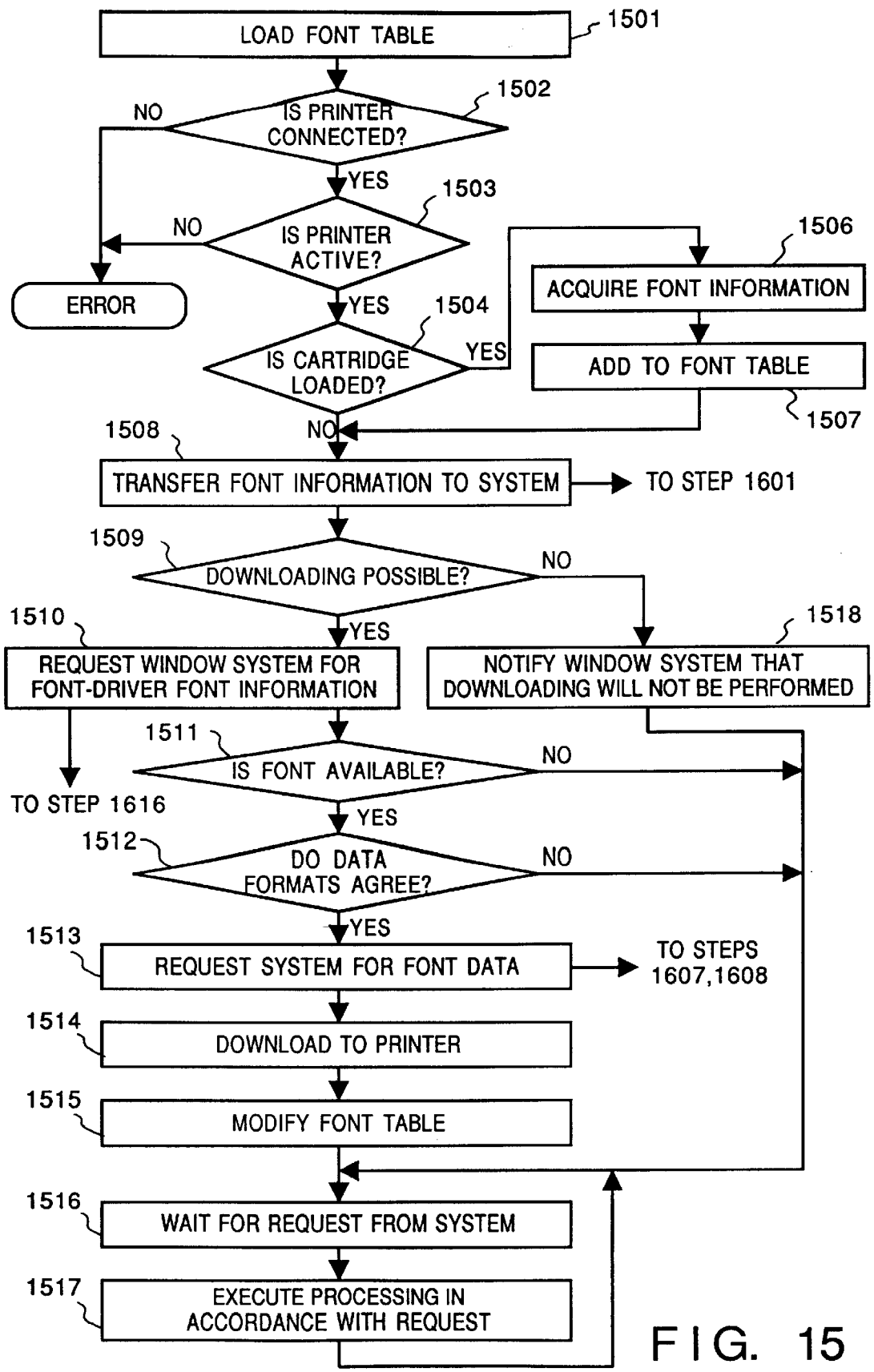
FIG. 15 is a flowchart showing a control procedure of printer driver in a case where cartridge determination and a downloading determination are performed in a printer driver.
Figure 16:
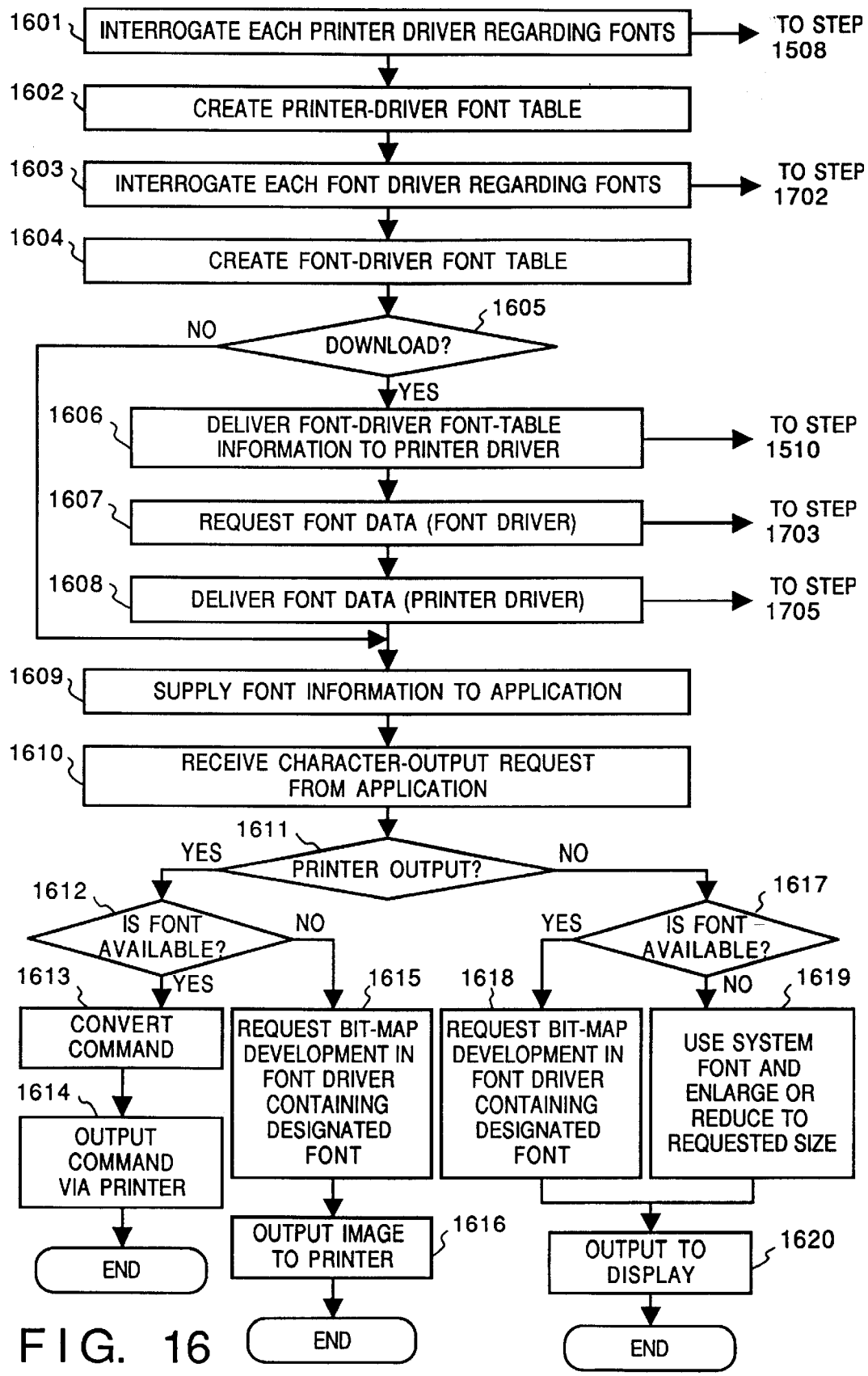
FIG. 16 is a flowchart showing a control procedure of a window system according to a fourth embodiment.
Figure 17:
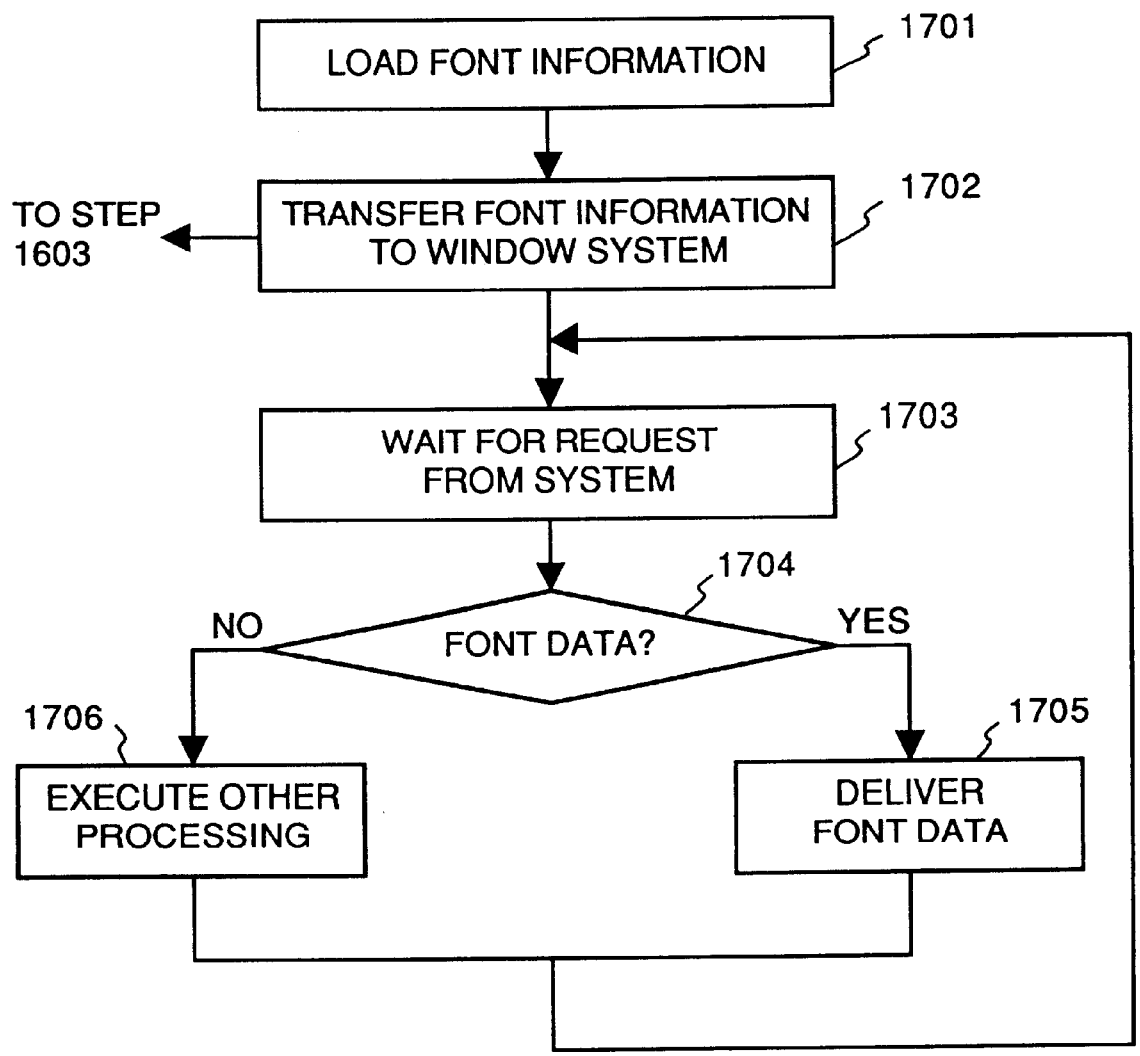
FIG. 17 is a flowchart showing a control procedure of a font driver according to the fourth embodiment.
Figure 18:
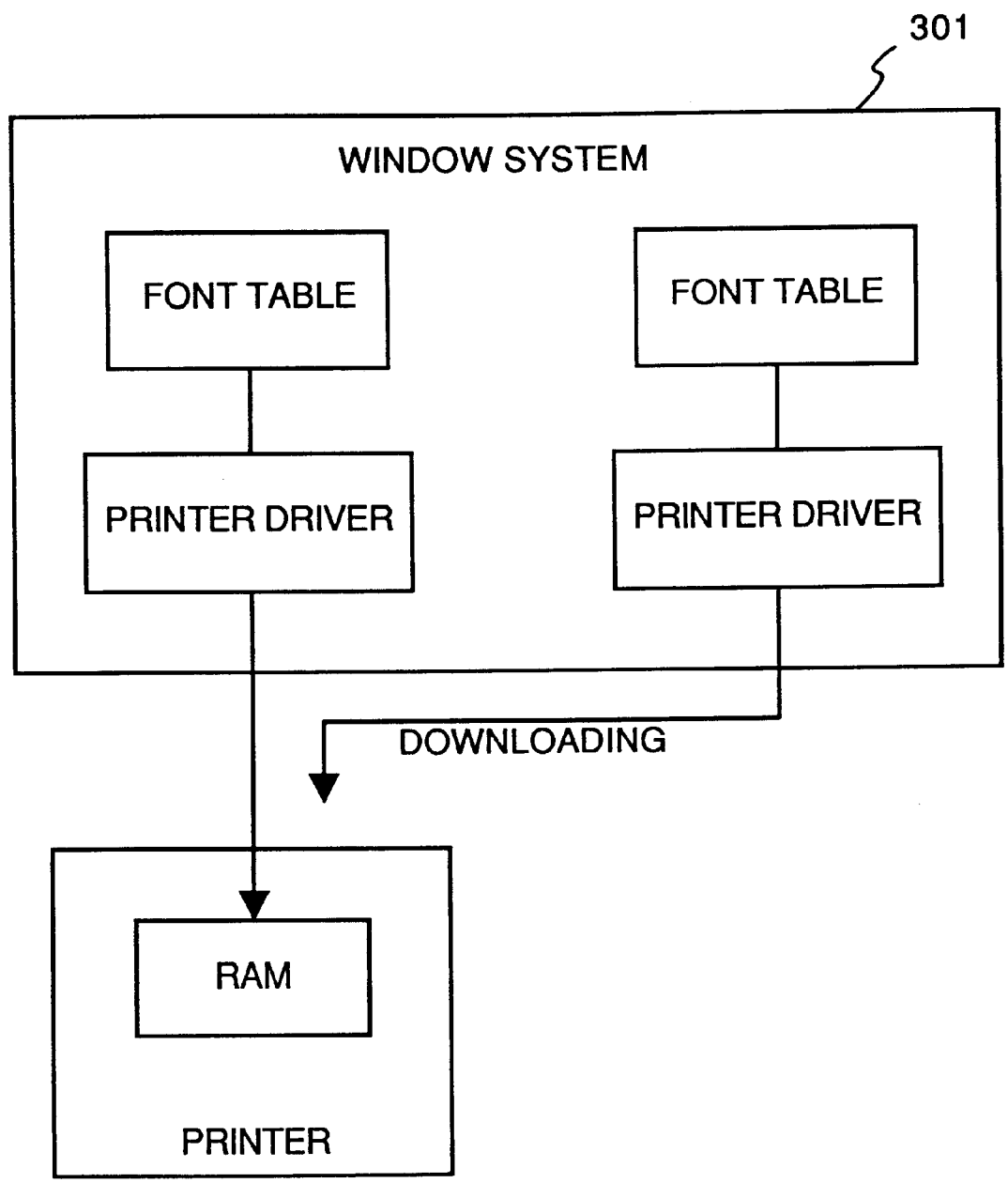
FIG. 18 is a diagram showing the flow of data in font downloading according to the fourth embodiment.
Figure 22:
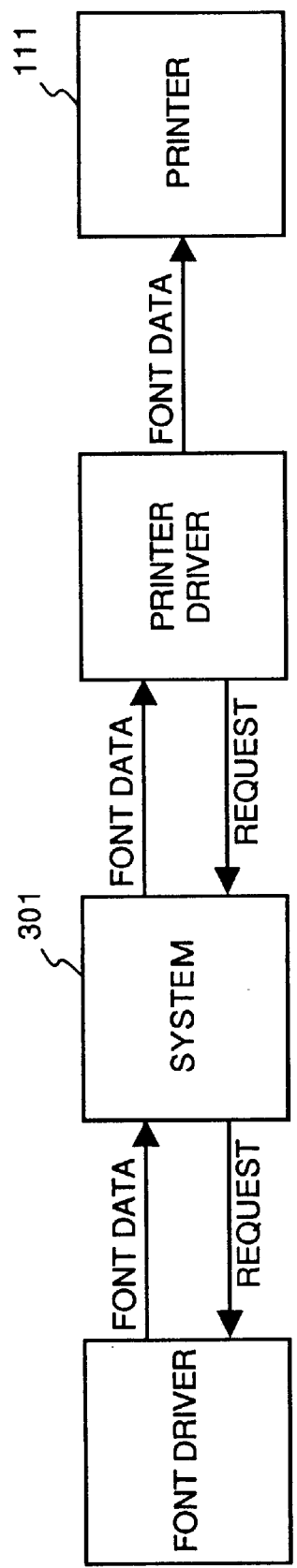
FIG. 22 is a diagram showing the flow of data in downloading in the fourth embodiment.

In the embodiments set forth thus far, arrangements are described in which the window system determines whether the cartridge has been loaded and whether downloading is possible. The fourth embodiment is one in which these processing operations are performed by the drivers. FIG. 15 is a flowchart showing the control procedure of the printer driver, FIG. 16 is a flowchart showing the control procedure of the system 301, and FIG. 17 is a flowchart showing the control procedure of the font driver.

According to downloading in the fourth embodiment, the printer driver takes the initiative and, if the font requested by the application program of the user has not been registered in the printer-driver font table, i.e., if the font is not usable in the printer 111, loads the font data from the font driver to the RAM of the printer 111.

The parallel operation of the printer driver, window system and font driver in downloading according to the fourth embodiment will be described with reference to FIGS. 15, 16 and 17.

When the system 301 is started up, the printer driver and font driver are started up and these are interrogated with regard to the fonts that have been registered in their respective font tables.

At step 1501, the started printer driver loads the font information stored in the hard disk 109 in the RAM 103 (work area 202 in FIG. 2). At this point in time, the fonts that have been registered in the printer driver are assumed to be of four types, as illustrated in FIG. 19.

Next, it is determined at step 1502 whether the printer 111 has been connected. If the connected has been connected, the program proceeds to step 1503; otherwise, the system generates an error and proceeds to step 1516.

It is determined at step 1503 whether the printer is in a usable state (i.e., active). If the printer is usable, the program proceeds to step 1504; otherwise, the system generates an error and proceeds to step 1516.

It is determined at step 1504 whether the ROM cartridge 112 has been loaded. If it has, the program proceeds to step 1506; otherwise, the program proceeds to step 1508. Information regarding the fonts stored in the cartridge 112 is read out of the cartridge at step 1506. It is assumed here that round Gothic-style fonts have been stored in the cartridge 112. The read font information is added to the font table in RAM 103 at step 1507, after which the program proceeds to step 1508. The font table at this time has information of the kind shown in FIG. 20A stored in the RAM 103.

At step 1508, the font information in RAM 103 is transferred to the system 301. At step 1601, the system 301 interrogates each printer driver with regard to their font information. At step 1602 in FIG. 16, the system 301 updates the font table based upon the new font information received from the printer driver at step 1601. The printer-driver font table is updated to the table of FIG. 20B owing to this updating operation.

At step 1603, the window system 301 interrogates the font driver regarding the usable fonts, just as in the case of the printer driver.

When the font driver (307 or 308) is started up from the system, the font-driver font information stored previously in the hard disk 109 is loaded in the RAM 103 (area 203 in FIG. 2) at step 1701. Next, at step 1702, the font information is transferred to the window system 301 in response to the inquiry (step 1603) from the system. A request from the system is awaited at step 1703.

When font information from the font driver is received, the font-driver font table is updated at step 1604 on the side of system 301. At this point in time, the font usable in the font driver is assumed to be a font X not in the printer driver, as illustrated in FIG. 21. At step 1605, the system waits for notification as to whether downloading is to be carried out from the printer driver.

At step 1509, the printer driver determines whether the connected printer 111 is capable of downloading. If he answer is YES, then the program proceeds to step 1510; if NO (e.g., if a RAM area that is to receive the new font as not been obtained in the printer), then the program proceeds to step 1518. If downloading is not possible, the system is notified at step 1518 of the fact that downloading will not be carried out (step 1606 in FIG. 16) and the program proceeds to step 1516. When downloading is possible, the program proceeds to step 1510 and font downloading is performed.

When the system 301 is notified by the printer driver of the fact that downloading will not be performed, the program proceeds to step 1609 in FIG. 16. Here the font information is sent to the application program, whereby the application program is informed of the fonts usable in the printer 111. If downloading can be carried out, on the other hand, then downloading is performed at steps 160–1705, after which the program proceeds to step 1609. Here the application program is informed of all fonts usable by the printer 111, inclusive of downloaded fonts.

Font downloading according to the fourth embodiment will now be described.

First, at step 1510, the system 301 is requested by the printer-driver side for font information that has been stored in the font driver. Upon receiving this request, the system 301 delivers the font-driver font table to the side of the printer driver at step 1606. A request of font data from the printer driver is awaited at step 1617.

On the side of the printer driver, the font-driver font information acquired at step 1510 and the printer-driver font information are compared and it is determined whether fonts registered as usable in the font driver but not registered in the printer driver exist. If there is not even one such font, downloading is not executed the program proceeds to step 1516, where the system is informed of suspension of downloading. On the other hand, if there is even one font registered as usable in the font driver but not registered in the printer driver, the program proceeds to step 1512; otherwise, the program proceeds to step 1516.

At step 1512, a font whose data format is identical with that of the printer driver is selected from the one or plurality of fonts selected at step 1511. If even one font having the same format exists in the font driver, the program proceeds to step 1513; otherwise, the program proceeds to step 1516. A request for the font data selected at step 1512 is sent to the system 301 at step 1513.

Upon receiving this request at step 1607 (FIG. 16), the system 301 requests this font data from the font driver possessing it. Upon receiving this request at step 1703, the printer-driver side determines at step 1704 that this request is a request for font data. The requested font data is sent to the system 301 at step 1705.

Upon receiving the font data at step 1608, the system 301 transfers this font data to the printer driver. The printer driver receives the transferred font data at step 1513 and downloads the data to the printer 111 at step 1514. The printer-driver font table is updated at step 1515. As a result, the font table reflects the fact that the font X is now usable.

Upon the completion of downloading, the system 301, at step 1609, sends the application program the information regarding all fonts (inclusive of downloaded fonts and fonts stored in the cartridge) usable in the printer 111.

The application program which has received this font information at step 408 executes steps 409 and 410 and sends the system 301 a character-output request at step 411. At step 1610, the system 301 receives this request, along with a flag indicating whether an output to the printer or an output to the display is to be performed, as well as information such as font name, size, embellishment and output-printer designating information, from the application program.

Next, at step 1611, the system 301 determines whether the designated destination for the output is the printer. If the answer is YES, then the program proceeds to step 1612; otherwise, the program proceeds to step 1617.

On the other hand, the printer driver repeats a procedure in which processing in executed in response to a request from the system 301 in the loop consisting of steps 1516→1517→1516. Further, the font driver also repeats a procedure in which processing in executed in response to a request from the system 301 in the loop consisting of steps 1703→1704→1706→1703.

When output destination is the display

At step 1617, the system 301 determines whether the font table (FIG. 6) of the font driver (307 or 308) contains the font name requested by the application program at step 1610. If the table does contain the font name, then the program proceeds to step 1618, at which it is requested that the font driver (307 or 308) containing the font develop, into a bit map, the characters expressed by the font requested by the application program. The developed result is displayed on the display 107 via the display driver 304 at step 1620. In the previous examples, FIGS. 8A and 10A correspond to this display.

If it is found at step 1617 that the font driver does not contain the font name, then the program proceeds to step 1619. Here the system font is enlarged or reduced to the requested size. The result is displayed on the display device via the display driver 304 at step 1620. In the previous examples, FIG. 9A corresponds to this display.

When output destination is the printer

Step 1612 is processing executed when the output is to the printer. It is determined at step 1612 whether the printer driver (302 or 303) contains the font name requested at step 1610. If the answer is YES, the program proceeds to step 1613; otherwise, the program proceeds to step 1615. A code conversion corresponding to the printer is carried out by the designated printer driver at step 1613, the code is transferred to the printer and printed out at step 1614, and processing is terminated. In the previous examples, FIGS. 9B and 10B correspond to this print-out. The code conversion referred to here involves converting a system-specific code outputted by the window system into a code (which may be a language such as PDL or data) capable of being handled by the designated printer. If the font is not present in the printer, the font driver in which the font is present is requested to develop the font into a bit-map format at step 1615. Then, at step 1616, the image is transferred to the printer via this printer driver. Here the image is printed out and processing is terminated.

<Modification>

The present invention can be modified in various ways within the scope of the claims.

In the four embodiments set forth above, the invention is applied to a configuration having one printer and one host system. However, the invention is not limited to this arrangement. For example, the invention is applicable to a case in which one printer server is shared by a plurality of host systems or a case in which one host system uses a plurality of printers.

Of course, the present invention is applicable also to a case in which one or most host systems and one or more printers are connected to a network such as a LAN.

Furthermore, though the system of FIG. 1 is itself a host system, the present invention is applicable also to an extended system in which the system of FIG. 1 is positioned with a so-called printer controller and the controller is further connected to another host computer.

Further, the embodiments to which the present invention is applied may be a Japanese word processor, a work station or a computer system.

In the foregoing embodiments, the fonts externally supplied to the printer are stored in a ROM cartridge. However, a large-capacity magnetic disk may be used instead of the ROM.

As many apparently widely different embodiments of the present invention can be made without departing from the spirit and scope thereof, it is to be understood that the invention is not limited to the specific embodiments thereof except as defined in the appended claims.

What is claimed is:

1. A character processing apparatus comprising:

obtaining means for obtaining font information from a font memory which can be attached to or removed from a printer;

creating means for creating a font table including the font information obtained by said obtaining means;

determining means for determining whether or not a font required for printing a document is present in the printer in accordance with the font table;

output means for, in a case where the font is present in the printer, outputting a code for printing the document to the printer, otherwise, outputting an image for printing the document to the printer; and second determination means for determining whether or not the font memory which can be attached to or removed from a printer is attached, wherein said obtaining means obtains font information of the font memory when it is determined that the font memory is attached by said second determination means.

2. The apparatus according to claim 1, wherein when it is determined that the font is not present in the printer by said determination means, said output means requests a font driver to develop the font into a bitmap.

3. A method of processing a character comprising the steps of:

obtaining font information from a font memory which can be attached to or removed from a printer; creating a font table including the font information obtained in said obtaining step;

determining whether or not a font required for printing a document is present in the printer in accordance with the font table;

in a case where the font is present in the printer, outputting a code for printing the document to the printer, otherwise, outputting an image for printing the document to the printer; and determining whether or not the font memory which can be attached to or removed from a printer is attached, wherein font information of the font memory is obtained in said obtaining steep when it is determined that the font memory is attached in said second determining step.

4. The method according to claim 3, wherein when it is determined that the font is not present in the printer in said determining step, a font driver is requested to develop the font into a bitmap in said outputting step.

5. A computer-readable storage medium comprising a program for performing a character processing method, the method comprising the steps of:

obtaining font information from a font memory which can be attached to or removed from a printer;

creating a font table including the font information obtained in said obtaining step;

determining whether or not a font required for printing a document is present in the printer in accordance with the font table;

in a case where the font is present in the printer, outputting a code for printing the document to the printer, otherwise, outputting an image for printing the document to the printer; and determining whether or not the font memory which can be attached to or removed from a printer is attached, wherein font information of the font memory is obtained in said obtaining step when it is determined that the font memory is attached in said second determining step.

6. The computer-readable storage medium according to claim 5, wherein when it is determined that the font is not present in the printer in said determining step, a font driver is requested to develop the font into a bitmap in said outputting step.

7. A computer program product stored in a computer-readable storage medium, the computer program product comprising code for performing a character processing method, the method comprising the steps of:

obtaining font information from a font memory which can be attached to or removed from a printer;

creating a font table including the font information obtained in said obtaining step;

determining whether or not a font required for printing a document is present in the printer in accordance with the font table;

in a case where the font is present in the printer, outputting a code for printing the document to the printer, otherwise, outputting an image for printing the document to the printer; and determining whether or not the font memory which can be attached to or removed from a printer is attached, wherein font information of the font memory is obtained in said obtaining step when it is determined that the font memory is attached in said second determining step.

8. The computer program product according to claim 7, wherein when it is determined that the font is not present in the printer in said determining step, a font driver is requested to develop the font into a bitmap in said outputting step.

* * * * *

UNITED STATES PATENT AND TRADEMARK OFFICE
CERTIFICATE OF CORRECTION

PATENT NO.    : 6,507,407 B1
DATED         : January 14, 2003
INVENTOR(S)   : Hirotsugu Matsumoto It is certified that error appears in the above-identified patent and that said Letters Patent is hereby corrected as shown below:

<u>Title page, Item [54] and Column 1, line 4,</u>
Title, "AVAILABILTY" should read -- AVAILABILITY --.
Item [*] Notice, after "Subject to… 0 days" insert -- ¶ This patent issued on a continued prosecution application filed under 37 CFR 1.53(d), and is subject to the twenty year patent term provisions of 35 U.S.C. § 154(a)(2). --

<u>Column 3,</u>
Line 11, "processing," should read -- processes --.

<u>Column 5,</u>
Line 43, "is 10" should read -- is --; and
Lines 48 and 50, "printer 11," should read -- printer 111, --.

<u>Column 10,</u>
Line 45, "It" should read -- If --.

<u>Column 11,</u>
Line 32, "connected" (first occurrence) should read -- printer --.

<u>Column 12,</u>
Line 23, "steps 160-1705," should read -- steps 1606-1608 --.

<u>Column 14,</u>
Line 55, "creating" should read -- ¶ creating --.

UNITED STATES PATENT AND TRADEMARK OFFICE
CERTIFICATE OF CORRECTION

PATENT NO. : 6,507,407 B1
DATED : January 14, 2003
INVENTOR(S) : Hirotsugu Matsumoto It is certified that error appears in the above-identified patent and that said Letters Patent is hereby corrected as shown below:

<u>Column 15,</u>
Line 2, "steep" should read -- step --.

Signed and Sealed this

Seventeenth Day of February, 2004

JON W. DUDAS
*Acting Director of the United States Patent and Trademark Office*